United States Patent
Guo

(10) Patent No.: US 10,255,508 B2
(45) Date of Patent: Apr. 9, 2019

(54) IMAGE EVALUATION METHOD AND ELECTRONIC APPARATUS THEREOF TO EVALUATE WHETHER THE VEHICLE IS DEVIATED FROM A LANE

(71) Applicant: Wistron Corporation, New Taipei (TW)

(72) Inventor: Jun-Lin Guo, New Taipei (TW)

(73) Assignee: Wistron Corporation, New Taipei (TW)

( * ) Notice: Subject to any disclaimer, the term of this patent is extended or adjusted under 35 U.S.C. 154(b) by 212 days.

(21) Appl. No.: 15/264,615

(22) Filed: Sep. 14, 2016

(65) Prior Publication Data

US 2017/0337433 A1 Nov. 23, 2017

(30) Foreign Application Priority Data

May 17, 2016 (TW) .............................. 105115125 A

(51) Int. Cl.
   *G06K 9/00* (2006.01)
   *G06K 9/46* (2006.01)
(52) U.S. Cl.
   CPC ..... *G06K 9/00798* (2013.01); *G06K 9/00523* (2013.01); *G06K 9/00536* (2013.01); *G06K 9/4609* (2013.01); *G06K 9/4661* (2013.01)
(58) Field of Classification Search
   None
   See application file for complete search history.

(56) References Cited

U.S. PATENT DOCUMENTS

| 2010/0002911 A1* | 1/2010 | Wu ..................... B60W 30/12 382/104 |
| 2010/0054538 A1* | 3/2010 | Boon ................. G06K 9/00798 382/104 |

(Continued)

FOREIGN PATENT DOCUMENTS

| TW | I337144 | 2/2011 |
| TW | 201224954 | 6/2012 |
| TW | I478833 | 4/2015 |

OTHER PUBLICATIONS

"Office Action of Taiwan Counterpart Application," with partial English translation thereof, dated Jul. 7, 2017, p. 1-p. 8, in which the listed references were cited.

*Primary Examiner* — Atiba O Fitzpatrick
(74) *Attorney, Agent, or Firm* — JCIPRNET

(57) ABSTRACT

An image evaluation method and an electronic apparatus thereof are provided. The method is adapted to the electronic apparatus installed at a vehicle for evaluating whether the vehicle is deviated from a lane, and the electronic apparatus includes at least one image capture unit. The method includes the following steps. An image related to driving environment is obtained by the image capture unit. According to an evaluation criterion, a plurality of candidate pair and corresponding candidate points in the image are evaluated from an arbitrary row of pixels of the image to recognize lane stripes in the image. A corresponding position of a feature portion of the vehicle corresponding to the image is calculated. The corresponding position of the feature portion corresponding to the image is compared with the lane stripes to determine whether the vehicle is towards or crosses over real lane stripes.

30 Claims, 9 Drawing Sheets

(56) References Cited

U.S. PATENT DOCUMENTS

| | | | |
|---|---|---|---|
| 2010/0231718 A1* | 9/2010 | Nakamori | G06K 9/00798 |
| | | | 348/148 |
| 2012/0140039 A1* | 6/2012 | Ota | B60W 30/12 |
| | | | 348/46 |
| 2013/0054086 A1 | 2/2013 | Lo et al. | |
| 2017/0123430 A1* | 5/2017 | Nath | B62D 15/0255 |
| 2017/0184396 A1* | 6/2017 | Tateishi | G01B 11/24 |

* cited by examiner

IMAGE EVALUATION METHOD AND ELECTRONIC APPARATUS THEREOF TO EVALUATE WHETHER THE VEHICLE IS DEVIATED FROM A LANE

CROSS-REFERENCE TO RELATED APPLICATION

This application claims the priority benefit of Taiwan application serial no. 105115125, filed on May 17, 2016. The entirety of the above-mentioned patent application is hereby incorporated by reference herein and made a part of this specification.

BACKGROUND OF THE INVENTION

Field of the Invention

The disclosure relates to an evaluation method and an electronic apparatus thereof, and particularly relates to an image evaluation method and an electronic apparatus thereof for evaluating whether a vehicle is deviated from a lane.

Description of Related Art

Along with development of technology, vehicles are widely used in people's daily life, and become commonly used transportation tools. However, along with popularization of the vehicles, traffic accidents and the number of casualties are increased. In view of the traffic accidents, improper operation and attention distraction of drivers are common factors causing the accidents. In order to reduce the traffic accidents, an advanced driver assistance system (ADAS) is provided to assist the drivers. The ADAS is mainly to collect driving information to perform recognition, and then correspondingly remind the driver with road conditions or various possible situations. Generally, the traffic accident of the vehicles is occurred when one vehicle crosses over or deviates from a current driving lane to rear-end collide with or sideswipe other vehicles. Therefore, if the driver can be reminded when the vehicle is deviated from a lane, the driver can be aware of dangerous to decrease a chance of occurrence of the traffic accident.

To be specific, since the vehicle is running on a road with real lane stripes, whether the vehicle is deviated from a lane can be determined by determining whether the vehicle crosses over the real lane stripes. Generally, lane stripe detection is to first acquire a front image including the lane stripes, and then identify positions of the lane stripes in the front image, so as to determine whether the vehicle crosses over the real lane stripes. However, the current lane stripe detection is generally to determine the positions of the lane stripes purely according to brightness information in the front image, which cannot effectively filter noises caused by vehicle lights, license plates, white rocks, ground light reflection, etc. To be specific, many objects in a driving environment may have a detection brightness similar to that of the lane stripes. Therefore, to provide a more accurate image evaluation method and an electronic apparatus thereof to evaluate whether the vehicle is deviated from a lane is still one of the targets pursued by related technicians of the field.

SUMMARY OF THE INVENTION

The disclosure is directed to an image evaluation method and an electronic apparatus thereof, by which lane stripes are recognized based on an evaluation criterion, and a feature portion of a vehicle is adopted to determined whether the vehicle crosses over real lane stripes, so as to accurately evaluate whether the vehicle is deviated from a lane.

An embodiment of the disclosure provides an image evaluation method, which is adapted to an electronic apparatus installed in a vehicle for evaluating whether the vehicle is deviated from a lane. The electronic apparatus includes at least one image capturing unit. The image evaluation method includes the following steps. An image related to a driving environment is obtained by the image capturing unit. According to an evaluation criterion, a plurality of candidate pairs and corresponding candidate points in the image are evaluated from an arbitrary row of pixels of the image to recognize a lane stripe in the image. A corresponding position of a feature portion of the vehicle corresponding to the image is calculated. The corresponding position of the feature portion corresponding to the image is compared with the lane stripe to determine whether the vehicle is towards or crosses over a real lane stripe.

An embodiment of the disclosure provides an electronic apparatus, which is adapted to be installed in a vehicle for evaluating whether the vehicle is deviated from a lane. The electronic apparatus includes at least one image capturing unit, a recognition unit, a calculation unit and a comparison unit. The image capturing unit is adapted to obtain an image related to a driving environment. The recognition unit is coupled to the image capturing unit. The recognition unit evaluates a plurality of candidate pairs and corresponding candidate points in the image according to an evaluation criterion from an arbitrary row of pixels of the image to recognize a lane stripe in the image. The calculation unit is coupled to the image capturing unit and the recognition unit. The calculation unit calculates a corresponding position of a feature portion of the vehicle corresponding to the image. The comparison unit is coupled to the recognition unit and the calculation unit, and compares the corresponding position of the feature portion corresponding to the image with the lane stripe to determine whether the vehicle is towards or crosses over a real lane stripe.

According to the above description, in the image evaluation method and the electronic apparatus thereof provided by the disclosure, the evaluation criterion is adopted to evaluate the candidate pairs and the corresponding candidate points in the image to recognize the lane strips, and the corresponding position of the feature portion corresponding to the image is compared with the lane stripes to determine whether the vehicle crosses over the real lane stripes, so as to achieve more accurate lane strip recognition and lane deviation evaluation.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1A:
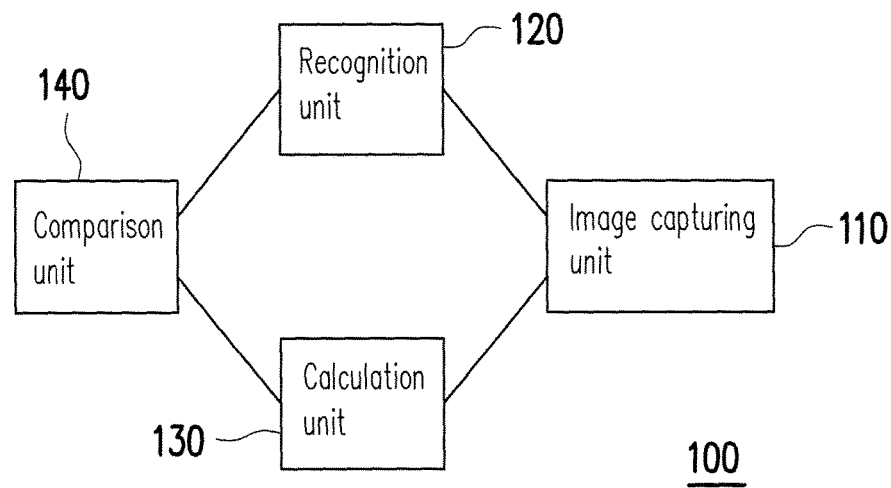
FIG. 1A is a schematic diagram of an electronic apparatus according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

When it is evaluated whether a vehicle is deviated from a lane, lane stripes have to be detected, and whether the vehicle is deviated from the lane is determined according to the detected lane stripes. In other words, a lane deviation evaluation technique mainly includes two portions of lane strip detection and off lane detection. In the embodiments of the disclosure, according to the image evaluation method and the electronic apparatus thereof, an image of a driving environment is first obtained, and an evaluation criterion is adopted to recognize the lane stripes in the image. Then, a corresponding position of a feature portion of the vehicle corresponding to the image is compared with the lane stripes to determine whether the vehicle crosses over real lane stripes.

FIG. 1A is a schematic diagram of an electronic apparatus according to an embodiment of the disclosure. Referring to FIG. 1A, the electronic apparatus 100 include an image capturing unit 110, a recognition unit 120, a calculation unit 130 and a comparison unit 140. In the present embodiment, the number of the image capturing unit 110 is one, though the disclosure is not limited thereto. In other embodiments, the number of the image capturing unit 110 can be two or more. In an embodiment of the disclosure, the electronic apparatus 100 is, for example, a tablet personal computer (PC), a smart phone, a smart mobile device or a driving recorder, which is not limited by the disclosure. The electronic apparatus 100 is, for example, disposed inside a vehicle.

Referring to FIG. 1A, the image capturing unit 110 is coupled to the recognition unit 120 and the calculation unit 130. In the present embodiment, the image capturing unit 110 is, for example, a charge coupled device (CCD) or a complementary metal-oxide semiconductor (CMOS) image sensor, though the disclosure is not limited thereof. In an embodiment of the disclosure, the image capturing unit 110 is adapted to obtain an image related to a driving environment. To be specific, regardless whether the vehicle is moved or stopped, the image capturing unit 110 obtains an image in front of the vehicle. However, in another embodiment of the disclosure, the image capturing unit 110 captures the image of the driving environment only when a moving speed of the vehicle reaches a speed limit. On the other hand, in still another embodiment of the disclosure, when the vehicle makes a U-shaped turn, since the moving speed thereof is relatively slow, and the captured image is liable to have an image noise or the image capturing unit 110 is liable to capture an image non-related to the driving environment, the electronic apparatus 100 does not perform the lane deviation evaluation.

Referring to FIG. 1A, in the present embodiment, the recognition unit 120 is coupled to the calculation unit 130, and the comparison unit 140 is coupled to the recognition unit 120 and the calculation unit 130. It should be noted that in an embodiment of the disclosure, the recognition unit 120, the calculation unit 130 and the comparison unit 140 can be implemented through software or firmware, and the software or firmware can be loaded to a processing unit (not shown) of the electronic apparatus 100 to implement the functions of the recognition unit 120, the calculation unit 130 and the comparison unit 140, though the disclosure is not limited thereto. It should be noted that in another embodiment of the disclosure, the recognition unit 120, the calculation unit 130 and the comparison unit 140 can also be implemented through physical circuit structures.

In an embodiment of the disclosure, the processing unit of the electronic apparatus 100 is, for example, a microcontroller, an embedded controller, a central processing unit (CPU), a field programmable gate array (FPGA), an application-specific integrated circuit (ASIC) or similar device, which is not limited by the disclosure.

Figure 1B:
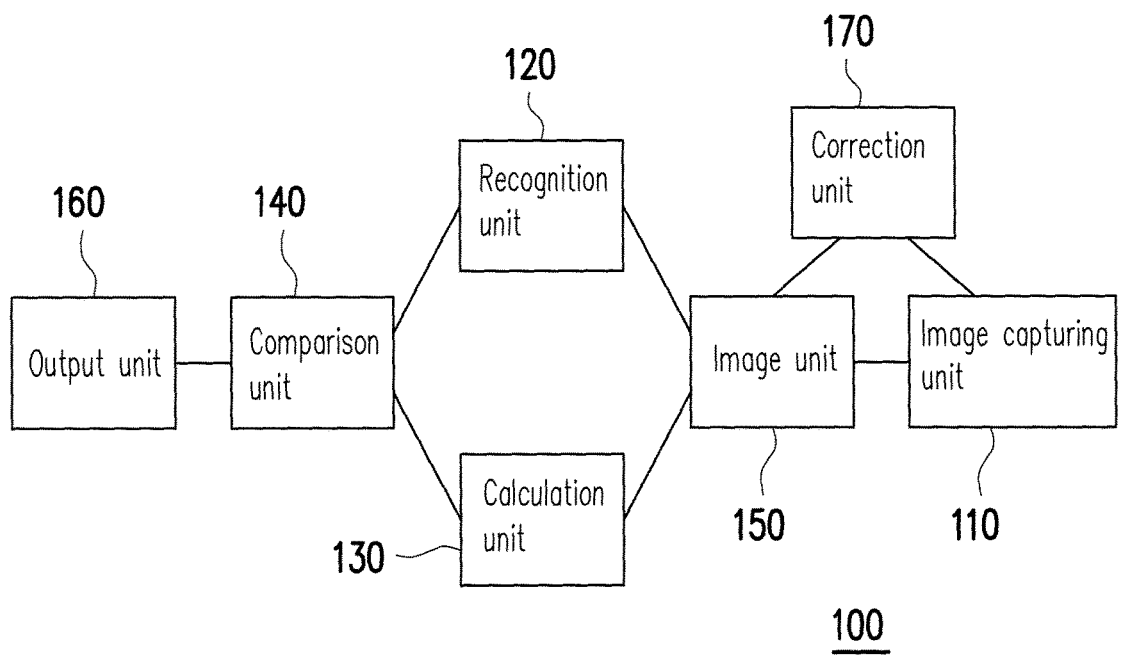
FIG. 1B is a schematic diagram of an electronic apparatus according to another embodiment of the disclosure.

FIG. 1B is a schematic diagram of an electronic apparatus according to another embodiment of the disclosure. Referring to FIG. 1B, compared to FIG. 1A, the electronic apparatus 100 of the present embodiment further includes an image unit 150, an output unit 160 and a correction unit 170. The image unit 150 is coupled among the image capturing unit 110, the recognition unit 120 and the calculation unit 130, and the correction unit 170 is coupled to the image capturing unit 110 and the image unit 150. In more detail, the image unit 150 is adapted to perform image processing, and is used together with the image capturing unit 110, the correction unit 170 to obtain the image of the driving environment. In the present embodiment, the image unit 150, the correction unit 170 are, for example, implemented by software or firmware, and the software or firmware can be loaded to the processing unit (not shown) of the electronic apparatus 100 for implementation. However, in another embodiment of the disclosure, the image unit 150 and the correction unit 170 are, for example, implemented by physical circuit structures.

In an embodiment of the disclosure, the output unit 160 is, for example, a display screen, a loudspeaker, an earphone, etc. In the present embodiment, the output unit 160 is used for outputting message of the electronic apparatus 100. In an embodiment of the disclosure, the electronic apparatus 100, for example, further includes a storage unit (not shown). The storage unit is, for example, a hard disk, a random access memory (RAM) or a similar device having a storage function for storing various messages and data.

Figure 2:
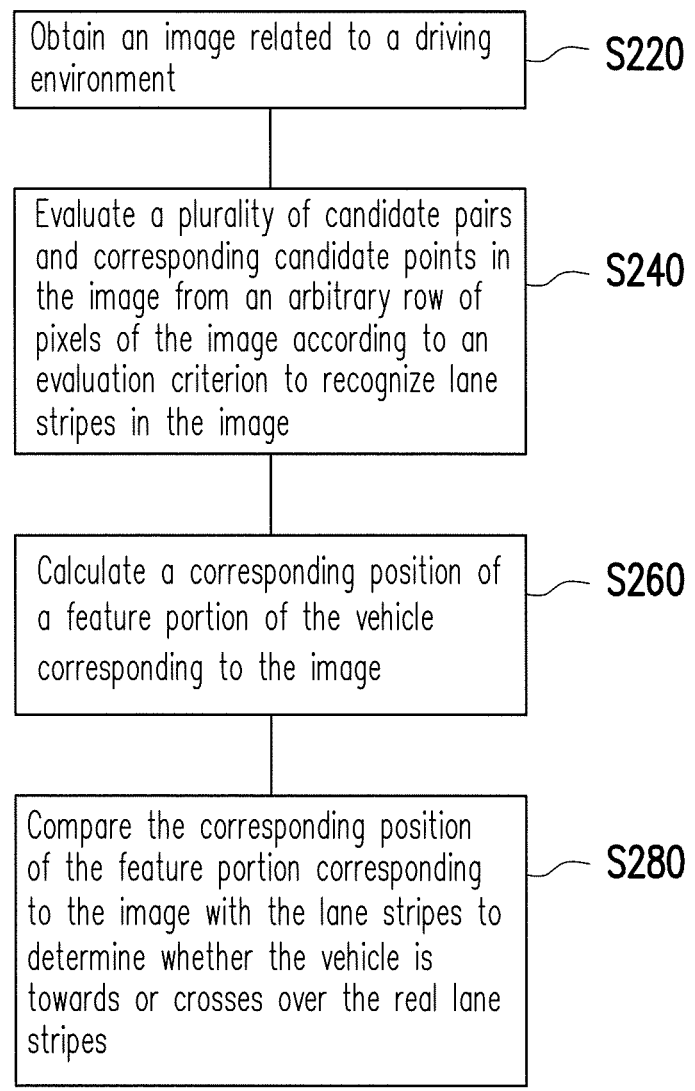
FIG. 2 is a flowchart illustrating an image evaluation method according to an embodiment of the disclosure.

FIG. 2 is a flowchart illustrating an image evaluation method according to an embodiment of the disclosure. In the present embodiment, the image evaluation method of FIG. 2 is, for example, adapted to the electronic apparatus 100 shown in FIG. 1A and FIG. 1B for evaluating whether a vehicle is deviated from a lane, though the disclosure is not limited thereto. Referring to FIG. 1A, FIG. 1B and FIG. 2, an image related to a driving environment is obtained by the image capturing unit 110 (step S220). The recognition unit 120 obtains the image related to the driving environment, and evaluates a plurality of candidate pairs and corresponding candidate points in the image according to an evaluation criterion from an arbitrary row of pixels of the image to recognize lane stripes in the image (step S240). On the other hand, the calculation unit 130 obtains the image related to the driving environment, and calculate a corresponding position of a feature portion of the vehicle corresponding to the image (step S260). It should be noted that, in the present embodiment, the feature portion of the vehicle is, for example, a left front headlight and a right front headlight. Finally, the comparison unit 140 compares the corresponding position of the feature portion corresponding to the image with the lane stripes to determine whether the vehicle crosses over the real lane stripes (step S280). The steps of the image evaluation method are described in detail below with reference of figures.

Referring to FIG. 2, in the present embodiment, the image capturing unit 110 is used for obtaining the image of the driving environment, for example, the image capturing unit 110 directly obtains a gray level image of the driving environment, though the disclosure is not limited thereto. In another embodiment of the disclosure, after the image capturing unit 110 obtains an original image of the driving environment, the image unit 150 receives the original image and executes a digital image processing on the original image to obtain a gray level image or a binarization image related to the driving environment. To be specific, the digital image processing includes gray level processing, binarization processing, denoise processing, etc., though the disclosure is not limited thereto.

To be specific, the image evaluation method of the present disclosure adopts a gray level image or a binarization image in order to correctly recognize the lane strips in the image and filter noises probably causing misjudgement. In the present embodiment, the image related to the driving environment is composed of a plurality of pixels, and if a pixel specification of the image is 320×180, it represents that the image has 320 columns and 180 rows, and total 320×180 pixels, though the disclosure is not limited thereto.

After the image related to the driving environment is obtained, as shown in FIG. 2, started from an arbitrary row of the pixels of the image, the recognition unit 120 evaluates a plurality of candidate pairs and corresponding candidate points in the image according to an evaluation criterion to recognize lane stripes in the image. In detail, in the present embodiment, the recognition unit 120 first finds a set of brightness variation points in the image. To be specific, the set of the brightness variation points includes a first brightness variation point and a second brightness variation point. In the present embodiment, the first brightness variation point and the second brightness variation point are, for example, a brightness sudden rise point and a brightness sudden drop point, though the disclosure is not limited thereto. Then, the lane strips in the image are recognized based on each set of the brightness variation points (the brightness sudden rise point and the brightness sudden drop point).

Figure 3:
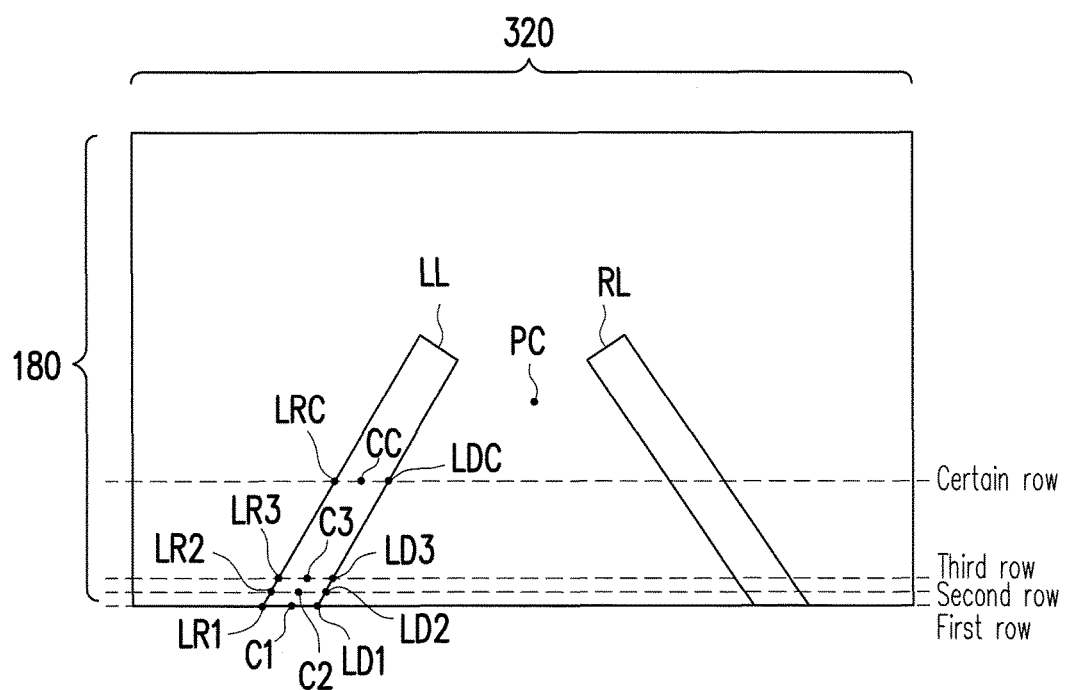
FIG. 3 is a schematic diagram of an image related to a driving environment according to an embodiment of the disclosure.

FIG. 3 is a schematic diagram of an image related to a driving environment according to an embodiment of the disclosure. The pixel specification of the image is, for example, the aforementioned 320×180, and the image has an image center PC. Referring to FIG. 3, generally, in a gray level image, lane strips LL and RL generally have a higher brightness value compared with that of other road potions, and generally have a more consistent width. In other words, the lane strips LL and RL are generally between one brightness sudden rise point (the first brightness variation point) and a brightness sudden drop point (the second brightness variation point) in the pixels of a same row, for example, between a brightness sudden rise point LR1 and a brightness sudden drop point LD1 of a first row of pixels, between a brightness sudden rise point LR2 and a brightness sudden drop point LD2 of a second row of pixels, between a brightness sudden rise point LR3 and a brightness sudden drop point LD3 of a third row of pixels, and between a brightness sudden rise point LRC and a brightness sudden drop point LDC of a certain row of pixels. Therefore, after a plurality of sets of the brightness variation points belonging to the lane stripes are recognized, center points C1, C2, C3, CC of the brightness sudden rise points and the brightness sudden drop points of a plurality sets of the brightness variation points are drawn to determine positions of the lane strips in the image. On the other hand, brightness variation points not belonging to the lane stripes have to be filtered or excluded. It should be noted that the aforementioned arbitrary row of pixels, is for example, the first row of pixels closest to the ground end in the driving environment of the image, though the disclosure is not limited thereto.

Figure 4:
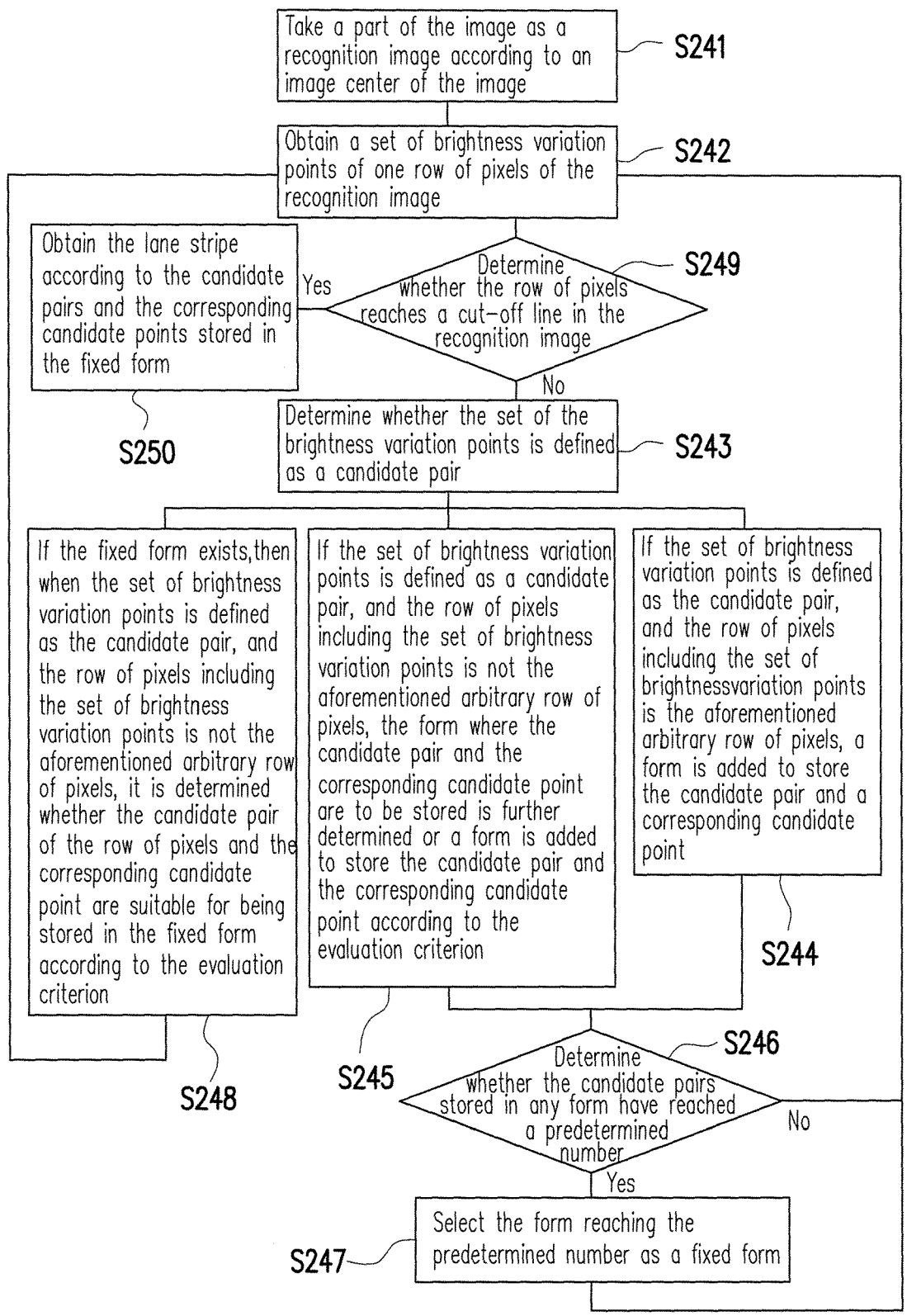
FIG. 4 is a flowchart illustrating a method for recognizing lane stripes in a recognition image according to an embodiment of the disclosure.

FIG. 4 is a flowchart illustrating a method for recognizing lane stripes in a recognition image according to an embodiment of the disclosure. Referring to FIG. 4, a process for determining whether a set of brightness variation points in the image belongs to a lane stripe is described below. In the present embodiment, the recognition unit 120 takes a part of the image as a recognition image according to an image center of the image (step S241). To be specific, the lane strips in the image may include a left lane strip LL and a right lane strip RL as that shown in FIG. 3. Therefore, in the process for recognizing the lane strips, the image center PC is taken as a boundary to obtain a left part or a right part of the image to serve as the recognition image. In the following embodiment, the left part of FIG. 3 is taken as the recognition image to describe the process for recognizing the lane strips in detail, though the disclosure is not limited thereto.

Referring to FIG. 4, from an arbitrary row of pixels of the recognition image, the recognition unit 120 obtains a set of brightness variation points of one row of pixels of the recognition image (step S242). The one set of brightness variation points includes a first brightness variation point and a second brightness variation point, and the first brightness variation point and the second brightness variation point are, for example, a brightness sudden rise point and a brightness sudden drop point. Then, the recognition unit 120 determines whether the set of the brightness variation points is defined as the candidate pair according to an evaluation criterion (step S243). In detail, in the present embodiment, started from an arbitrary row of pixels of the recognition image, each time when the recognition unit 120 obtains a set of brightness variation point, the recognition unit 120 determines whether the set of the brightness variation points is a possible candidate pair of the lane stripe according to the evaluation criterion. The arbitrary row of pixels can be the first row of pixels closer to the ground end in the recognition image, though the disclosure is not limited thereto. Comparatively, if the set of the brightness variation points is not complied with the evaluation criterion, such set of the brightness variation points are not taken as the possible candidate pair of the lane stripe.

Figure 5A:
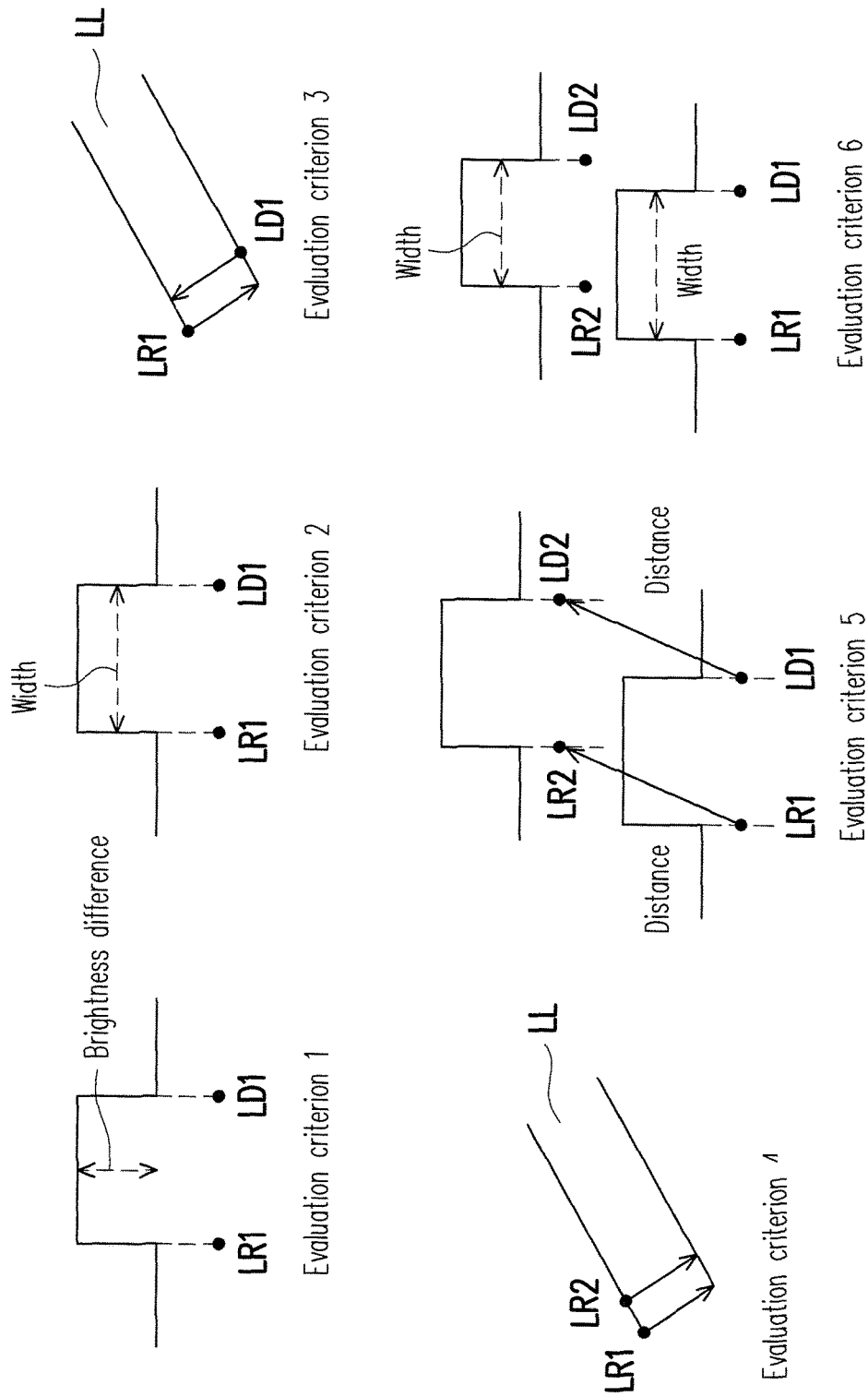
FIG. 5A and FIG. 5B are schematic diagrams of evaluation criteria according to an embodiment of the disclosure.
Figure 5B:
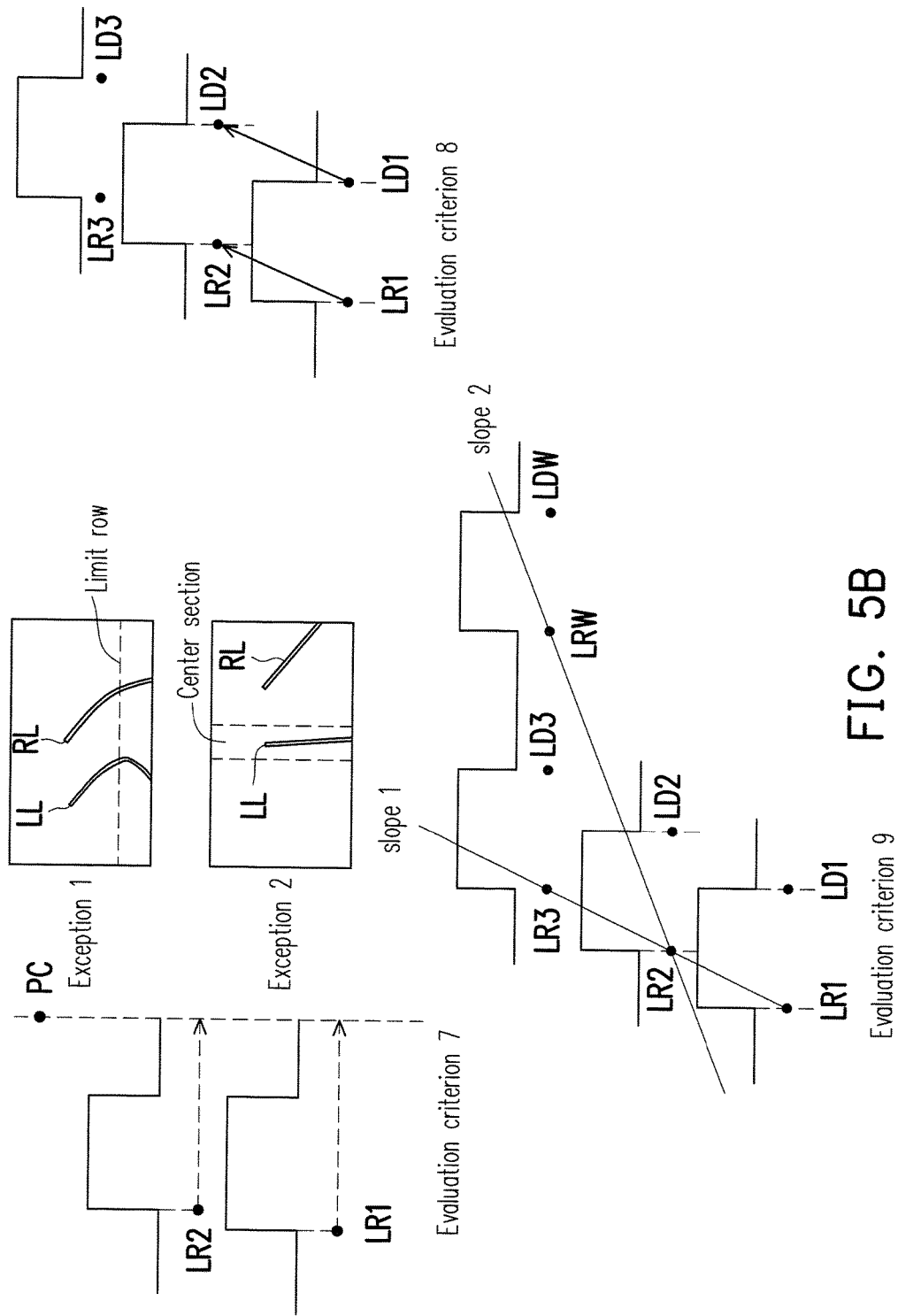

FIG. 5A and FIG. 5B are schematic diagrams of evaluation criterions according to an embodiment of the disclosure. To be specific, in the present embodiment, the evaluation criterion includes a plurality of different criterions, and the recognition unit 120 determines whether a set of brightness variation points of one row of pixels is the candidate pair according to an evaluation criterion 1, an evaluation criterion 2 and an evaluation criterion 3. It should be noted that, in the various criterions of FIG. 5A and FIG. 5B, a height of each waveform represents a magnitude of a brightness value, and the points corresponding to the waveform are a brightness sudden rise point (the first brightness variation point) or a brightness sudden drop point (the second brightness variation point) on one row of pixels, for example, the brightness sudden rise points LR1, LR2, LR3 or brightness sudden drop points LD1, LD2, LDd3 of FIG. 3, though the disclosure is not limited thereto.

Referring to FIG. 5A, in the evaluation criterion 1, the brightness sudden rise point LR1 and the brightness sudden drop point LD1 are taken as an example for description, though the disclosure is not limited thereto. In an embodiment of the disclosure, the evaluation criterion 1 is mainly to compare a brightness value between the brightness sudden rise point LR1 and the brightness sudden drop point LD1 with a brightness value before the brightness sudden rise point LR1, or compare the brightness value between the brightness sudden rise point LR1 and the brightness sudden drop point LD1 with a brightness value after the brightness sudden drop point LD1. To be specific, since the lane stripe in the image is brighter compared with the peripheral road portion, the brightness value between the brightness sudden rise point LR1 and the brightness sudden drop point LD1 corresponding to the lane stripe is greater than the brightness value before the brightness sudden rise point LR1 and the brightness value after the brightness sudden drop point LD1, theoretically.

Therefore, in the present embodiment, the recognition unit 120 determines whether a brightness difference between a brightness value between a set of brightness variation points and a brightness value before the first brightness variation point is greater than a brightness difference threshold according to the evaluation criterion 1, or determine whether a brightness difference between the brightness value between the set of the brightness variation points and a brightness value after the second brightness variation point is greater than the brightness difference threshold. If not, the set of the brightness variation points is not defined as the candidate pair.

Referring to FIG. 5A, in the evaluation criterion 2, the brightness sudden rise point LR1 and the brightness sudden drop point LD1 are taken as an example for description, though the disclosure is not limited thereto. In an embodiment of the disclosure, the evaluation criterion 2 is mainly to determine whether a width between the brightness sudden rise point LR1 and the brightness sudden drop point LD1 is within a proper range. In detail, the width of the real lane stripe generally has a specification, which is, for example, 10 to 15 cm. Comparatively, the lane stripe in the image should also have a corresponding width, and a width unit thereof is pixel number. Besides the width of the real lane stripe, the width of the lane stripe in the image is also subjected to influences of a setting height and a pitch angle of the image capturing unit 110. Therefore, a proper width range can be obtained and stored in the storage unit according to the width of the real lane stripe, the setting height of the image capturing unit and the pitch angle of the image capturing unit 110.

Therefore, in the present embodiment, the recognition unit 120 determines whether a width between a set of brightness variation points is complied with a proper width range according to the evaluation criterion 2. If not, the set of the brightness variation points is not defined as the candidate pair.

Referring to FIG. 5A, in the evaluation criterion 3, the brightness sudden rise point LR1 and the brightness sudden drop point LD1 are taken as an example for description, though the disclosure is not limited thereto. In an embodiment of the disclosure, the evaluation criterion 3 is mainly to determine whether directions of brightness gradients corresponding to the brightness sudden rise point LR1 and the brightness sudden drop point LD1 are consistent. Generally, the directions of the brightness gradients of the brightness sudden rise point LR1 and the brightness sudden drop point LD1 belonging to the same lane stripe are consistent.

Therefore, in the present embodiment, the recognition unit 120 determines whether directions of brightness gradients respectively corresponding to one set of brightness variation points are consistent according to the evaluation criterion 3. If not, the set of the brightness variation points is not defined as the candidate pair.

In the present embodiment, if one set of brightness variation points passes through evaluation of the evaluation criterion 1, the evaluation criterion 2 and the evaluation criterion 3, the recognition unit 120 defines the set of the brightness variation points as the candidate pair. In other words, the set of the brightness variation points is not excluded by the evaluation criterion 1, the evaluation criterion 2 and the evaluation criterion 3 to be not defined as the candidate pair. Referring to FIG. 4, if the set of the brightness variation points is defined as the candidate pair, and the row of pixels including the set of the brightness variation points is the aforementioned arbitrary row of pixels, the recognition unit 120 adds a form to store the candidate pair and a corresponding candidate point (step S244). In an embodiment of the disclosure, the candidate point corresponding to the candidate pair is a center point of the brightness variation points, i.e. the center point of the first brightness variation point and the second brightness variation point.

Referring to FIG. 3, taking the brightness sudden rise point LR1 and the brightness sudden drop point LD1 of the first row of pixels as an example, when the recognition unit 120 determines that the brightness sudden rise point LR1 and the brightness sudden drop point LD1 are defined as the candidate pair according to the evaluation criterion 1, the evaluation criterion 2 and the evaluation criterion 3, and the aforementioned arbitrary row of pixels is the first row of pixels, the recognition unit 120 adds a form to store the brightness sudden rise point LR1, the brightness sudden drop point LD1 and the center point C1 of the brightness sudden rise point LR1 and the brightness sudden drop point LD1.

On the other hand, in the present embodiment, in the present embodiment, if one set of brightness variation points is defined as the candidate pair, and the row of pixels including the set of the brightness variation points is not the aforementioned arbitrary row of pixels, the recognition unit 120 further determines the form where the candidate pair and the corresponding candidate point are to be stored or adds a form to store the candidate pair and the corresponding candidate point according to the evaluation criterion (step S245). To be specific, the image evaluation method provided by the disclosure is to search a plurality of sets of brightness variation points to serve as the candidate pairs from an arbitrary row of pixels. Therefore, once the searched object is moved to other row of pixels outside the aforementioned arbitrary row of pixels, the recognition unit 120 is further required to determine a relationship between each of the defined candidate pairs and the other candidate pairs to select the form used for storage or add a form. In the present embodiment, the aforementioned arbitrary row of pixels is, for example, the first row of pixels in the image of FIG. 3.

Referring to FIG. 3, FIG. 5A and FIG. 5B, the brightness sudden rise point LR2 and the brightness sudden drop point LD2 on the second row of pixels are taken as the first brightness variation point and the second brightness variation point of one set of brightness variation points, after the recognition unit 120 determines that the brightness sudden rise point LR2 and the brightness sudden drop point LD2 are defined as the candidate pair according to the evaluation criterion 1, the evaluation criterion 2 and the evaluation criterion 3, in the step S245 of the image evaluation method, the recognition unit 120 further determines the form where the candidate pair (the brightness sudden rise point LR2 and the brightness sudden drop point LD2) and the corresponding candidate point (the center point C2 of the brightness sudden rise point LR2 and the brightness sudden drop point LD2) to be stored or adds a form to store the candidate pair and the corresponding candidate point according to an evaluation criterion 4, an evaluation criterion 5, an evaluation criterion 6, an evaluation criterion 7, and evaluation criterion 8 and an evaluation criterion 9. It should be noted that, although the brightness sudden rise point LR2 (the first brightness variation point) and the brightness sudden drop point LD2 (the second brightness variation point) are taken as an example to describe the evaluation criterions 4-9, implementation objects of the evaluation criterions 4-9 are not limited to the brightness sudden rise point LR2 and the brightness sudden drop point LD2.

In an embodiment of the disclosure, regarding a set of brightness variation points (the brightness sudden rise point LR2 and the brightness sudden drop point LD2) of one row of pixels defined as the candidate pair, the evaluation criterion 4 to the evaluation criterion 7 further requires to use the candidate pair of the previous row of pixels relative to the above row of pixels on the recognition image to evaluate the form where the brightness sudden rise point LR2 and the brightness sudden drop point LD2 are to be stored or add a form to store the candidate pair and the corresponding candidate point. The candidate pair of the previous row of pixels is a set of previous brightness variation points, which includes a first previous brightness variation point and a second previous brightness variation point. To be specific, the brightness sudden rise point LR2 and the brightness sudden drop point LD2, for example, belong to the second row of pixels shown in FIG. 3, so that the recognition unit 120 further obtains the candidate pair belonging to the first row of pixels of the recognition image, which is, for example, the candidate pair including the brightness sudden rise point LR1 (i.e. the first previous brightness variation point) and the brightness sudden drop point LD1 (i.e. the second previous brightness variation point). In the present embodiment, the first row of pixels and the second row of pixels are adjacent to each other. The recognition unit 120 compares the brightness sudden rise point LR2 and the brightness sudden drop point LD2 with all of the candidate pairs existed on the first row of pixels to determine whether to add the candidate pair including the brightness sudden rise point LR2 and the brightness sudden drop point LD2 to the existing form, or add a form to store the candidate pair including the brightness sudden rise point LR2 and the brightness sudden drop point LD2 and the corresponding candidate point (the center point C2 of the brightness sudden rise point LR2 and the brightness sudden drop point LD2).

According to the above embodiment, conditions of the evaluation criterion 4 to the evaluation criterion 7 can be deduced. For another example, regarding the brightness sudden rise point LR3 and the brightness sudden drop point LD3 of the third row of pixels defined as the candidate pair, the evaluation criterion 4 to the evaluation criterion 7 further requires to use the candidate pair of the second row of pixels to evaluate the form where the candidate pair including the brightness sudden rise point LR3 and the brightness sudden drop point LD3 is to be stored or add a form to store the candidate pair including the brightness sudden rise point LR3 and the brightness sudden drop point LD3 and the corresponding candidate point (the center point C3 of the brightness sudden rise point LR3 and the brightness sudden drop point LD3).

Referring to FIG. 5A, the evaluation criterion 4 determines whether a direction of the brightness gradient corresponding to the brightness sudden rise point LR2 and a direction of the brightness gradient corresponding to the brightness sudden rise point LR1 (i.e. the first pervious brightness variation point) are consistent. In detail, regarding the brightness sudden rise points LR1 and LR2 belonging to two adjacent rows of pixels of the same lane stripe, the directions of the brightness gradients thereof should be consistent. Therefore, if the directions of the brightness gradients of the brightness sudden rise points LR1 and LR2 are not consistent, one of the candidate pair including the brightness sudden rise point LR2 and the candidate pair including the brightness sudden rise point LR1 does not belong to the lane stripe. It should be noted that, in another embodiment of the disclosure, the evaluation criterion 4 may also determine whether directions of the brightness gradients of the brightness sudden drop point LD2 and the brightness sudden drop point LD1 are consistent.

Therefore, in the present embodiment, according to the evaluation criterion 4, the recognition unit 120 determines whether a direction of a brightness gradient corresponding to the first brightness variation point of a candidate pair of a row of pixels is consistent with a direction of a previous brightness gradient corresponding to the first previous brightness variation point. If not, the candidate pair of the above row of pixels is not stored in the form corresponding to the candidate pair of the previous row of pixels.

Referring to FIG. 5A, the evaluation criterion 5 determines whether the brightness sudden rise point LR2 and the brightness sudden rise point LR1 (i.e. the first previous brightness variation point) are close to each other. Generally, if the brightness sudden rise point LR2 and the brightness sudden rise point LR1 belong to the same lane strip LL, a distance there between is not too large. The recognition unit 120 may determine whether the brightness sudden rise point LR2 and the brightness sudden rise point LR1 are close to each other according to a distance threshold. If the distance between the brightness sudden rise points LR1 and LR2 is not lower than the distance threshold, one of the candidate pair including the brightness sudden rise point LR2 and the candidate pair including the brightness sudden rise point LR1 does not belong to the lane stripe. It should be noted that, in another embodiment of the disclosure, the evaluation criterion 5 may also determine whether the distance between the brightness sudden drop point LD2 and the brightness sudden drop point LD1 is lower than the distance threshold.

Therefore, in the present embodiment, according to the evaluation criterion 5, the recognition unit 120 uses a previous pixel position of the first previous brightness variation point to determine whether a distance between a pixel position of the first brightness variation point of a candidate pair of one row of pixels and the previous pixel position is lower than the distance threshold. If not, the candidate pair of the above row of pixels is not stored in the form corresponding to the candidate pair of the previous row of pixels.

Referring to FIG. 5A, the evaluation criterion 6 determines whether a width between the brightness sudden rise point LR2 and the brightness sudden drop point LD2 is smaller than a width (i.e. a previous width) between the brightness sudden rise point LR1 (i.e. the first previous brightness variation point) and the brightness sudden drop point LD1 (i.e. the second previous brightness variation point). To be specific, since the width of the lane stripe in the image is gradually decreased from the first row of pixels, if the width between the brightness sudden rise point LR2 and the brightness sudden drop point LD2 is smaller than the width between the brightness sudden rise point LR1 and the brightness sudden drop point LD1, it represents that the brightness sudden rise point LR2, the brightness sudden drop point LD2, the brightness sudden rise point LR1 and the brightness sudden drop point LD1 probably belong to a same lane stripe.

Therefore, in the present embodiment, according to the evaluation criterion 6, the recognition unit 120 uses a previous width between the previous brightness variation points (the first previous brightness variation point and the second previous brightness variation point) to determine whether a width between the brightness variation points (the first brightness variation point and the second brightness variation point) of a candidate pair of one row of pixels is lower than the previous width. If not, the candidate pair of the above row of pixels is not stored in the form corresponding to the candidate pair of the previous row of pixels.

Referring to FIG. 5B, the evaluation criterion 7 determines whether the brightness sudden rise point LR2 is closer to the image center PC of the image compared to the brightness sudden rise point LR1 (i.e. the first previous brightness variation point). Generally, the lane strips in the image have a feature of gradually approaching the image center PC, so that whether the brightness sudden rise point LR2 and the brightness sudden rise point LR1 belong to a same lane stripe can be determined by determining a relative position of the brightness sudden rise point LR2, the brightness sudden rise point LR1 and the image center PC.

However, it should be noted that the evaluation criterion 7 has inapplicable exceptions. As shown in FIG. 5B, an exception 1 refers to that the row of pixels that includes the first brightness variation point evaluated by the evaluation criterion 7 has reached a limit row of the recognition image. To be specific, since the lane stripe can be a right turn lane stripe or a left turn lane stripe, after the limit row of the recognition image is exceeded, the trend towards the image center no longer exist. In this case, the evaluation criterion 7 is not applicable. In an embodiment of the disclosure, setting of the limit row is determined according to a pitch angle and a setting height of the image capturing unit 110. As shown in FIG. 5B, an exception 2 refers to that the first brightness variation point evaluated by the evaluation criterion 7 has reached a center section of the recognition image. In this case, the evaluation criterion 7 is also not applicable.

It should be noted that, in another embodiment of the disclosure, the evaluation criterion 7 may also determine whether the brightness sudden drop point LD2 is closer to the image center PC of the image compared to the brightness sudden drop point LD1 (i.e. the second previous brightness variation point).

Therefore, in the present embodiment, when one row of pixels of the recognition image does not reach the limit row of the recognition image, and the first brightness variation point of the above row of pixels is not in the center section of the recognition image, according to the evaluation criterion 7, the recognition unit 120 determines whether the pixel position of the first brightness variation point of the candidate pair of the above row of pixels is closer to the image center by using the previous pixel position of the first previous brightness variation point. If not, the candidate pair of the above row of pixels is not stored in the form corresponding to the candidate pair of the previous row of pixels.

In an embodiment of the disclosure, after the evaluation performed according to the evaluation criterion 4 to the evaluation criterion 7, if the candidate pair including one set of brightness variation points of one row of pixels is not stored in the form corresponding to any candidate pair of the previous row of pixels, the recognition unit 120, for example, adds a form to store the candidate pair of the above row of pixel, though the disclosure is not limited thereto.

In an embodiment of the disclosure, the evaluation criterion 8 and the evaluation criterion 9 further determine the form where a set of brightness variation points of a candidate pair on one row of pixels to be stored or add a form to store the candidate pair and the corresponding candidate point of the above row of pixels according to a plurality of candidate pairs and corresponding candidate points of a plurality of continuous rows of pixels in the recognition image Referring to FIG. 5B, the evaluation criterion 8 is, for example, to determine whether a first brightness variation point and a second brightness variation point (the brightness sudden rise point LR2 and the brightness sudden drop point LD2) of a set of brightness variation points serving as the candidate pair on the second row of pixels is adjacent to other candidate pairs of the recognition image, for example, the candidate pair including the brightness sudden rise point LR1 and the brightness sudden drop point LD1 and the candidate pair including the brightness sudden rise point LR3 and the brightness sudden drop point LD3. If the candidate pair including the brightness sudden rise point LR2 and the brightness sudden drop point LD2 is not adjacent to any candidate pair based on an adjacent distance threshold, a form is added to store the candidate including the brightness sudden rise point LR2 and the brightness sudden drop point LD2 on the second row of pixels.

Therefore, in the present embodiment, the recognition unit 120 determines whether a candidate pair of one row of pixels is adjacent to other candidate pairs of the recognition image. If not, a form is added to store the candidate pair of the above row of pixels.

The evaluation criterion 9 is, for example, to use a slope between brightness sudden rise points of a plurality of candidate pairs to determine whether to add a form to store a candidate pair. Referring to FIG. 5B, the slope between the brightness sudden rise points LR1 and LR2 and the slope between the brightness sudden rise points LR2 and LR3 are all a slope 1, which represents that the brightness sudden rise points LR1, LR2 and LR3 probably belong to a same lane stripe. Comparatively, taking a candidate pair including a brightness sudden rise point LRW as an example, a slope between the brightness sudden rise points LR2 and LRW is a slope 2. Since the slope 2 is quite different to the slope 1, the candidate pair including the brightness sudden rise point LRW is stored in an added form. It should be noted that, in an embodiment of the disclosure, a slope threshold can be adopted to determine whether a slope difference between the slope 2 and the slope 1 is greater enough to require a new form to store the candidate pair including the brightness sudden rise point LRW. In another embodiment of the disclosure, the evaluation criterion 9 may also determine a slope variation among the brightness sudden drop points LD1, LD2, LD3 and LDW to determine whether a new form is required to store the candidate pair including the brightness sudden rise point LD2, LD3 or LDW.

Therefore, in the present embodiment, according to the evaluation criterion 9, the recognition unit 120 obtains a previous slope corresponding to the first previous brightness variation point of a previous row of pixels, and calculates a slope between the first brightness variation point of a candidate pair of one row of pixels and the first previous brightness variation point, and determines whether a slope difference between the previous slope and the slope is lower than a slope threshold. If not, a form is added to store the candidate pair of the above row of pixels.

Referring to FIG. 4, after storing the defined candidate pairs and the corresponding candidate point into the form, the recognition unit 120 determines whether the candidate pairs stored in any form have reached a predetermined number (step S246). To be specific, during the process of recognizing the lane stripe provided by the disclosure, a plurality of sets of brightness variation points in the recognition image are sequentially inspected by the recognition unit 120 according to the evaluation criterion to determine the form used for storing the corresponding sets of candidate pairs or add a new form for storing the same. To be specific, the candidate pairs stored in the same form have stronger correlation in the recognition image, and probably belong to the same lane stripe in the recognition image.

Therefore, when the candidate pairs of any form reach the predetermined number, the recognition unit 120 determines that plurality sets of brightness variation points of plurality sets of candidate pairs in the form reaching the predetermined number belong to the lane stripe in the recognition image. Now, the recognition unit 120 selects the form reaching the predetermined number as a fixed form (step S247). The predetermined number is, for example, 13, though the disclosure is not limited thereto.

Comparatively, if the number of candidate pairs in any of the forms does not reach the predetermined number, the recognition unit 120 re-executes the step S242, and obtains a next set of brightness variation points in the recognition image to determine whether the next set of brightness variation points is defined as the candidate pair, and then determines the form used for storing the candidate pair or adds a form to store the candidate pair.

In an embodiment of the disclosure, the recognition unit 120 obtains a set of brightness variation points of a row of pixels in the recognition image (step S242), and determines whether the set of the brightness variation points is defined as the candidate pair (step S243). If the fixed form exists, then when the set of the brightness variation points is defined as the candidate pair, and the row of pixels including the set of the brightness variation points is not the arbitrary row of pixels, the recognition unit 120 determines whether the candidate pair of the row of pixels and the corresponding candidate point are suitable for being stored in the fixed form according to the evaluation criterion (step S248). In other words, once the fixed form is appeared, regarding one subsequently searched set of brightness variation points defined as the candidate pair, the recognition unit 120 determines whether to take the subsequently searched set of brightness variation points as the candidate pair for adding to the fixed form according to the candidate pairs in the fixed form and the evaluation criterion 4 to the evaluation criterion 9.

Referring to FIG. 4, in an embodiment of the disclosure, during the process of recognizing the lane stripe, after the recognition unit 120 obtains one set of brightness variation points of one row of pixels of the recognition image (step S242), the recognition unit 120 determines whether the row of pixels reaches a cut-off line in the recognition image (step S249). If the row of pixels reaches the cut-off line in the recognition image, the recognition unit 120 obtains the lane stripe according to the candidate pairs and the corresponding candidate points stored in the fixed form (step S250). Generally, the cut-off line in the recognition image is a horizontal line of the earth's surface. In the present embodiment, the arbitrary row of pixels serving as a start of the lane stripe recognition is generally lower than the cut-off line in the recognition image.

As described above, the recognition image is, for example, a left part or a right part of the image related to the driving environment. Therefore, in an embodiment of the disclosure, the recognition unit 120 further executes the lane stripe recognition to the different recognition images to obtain the left lane stripe LL and the right lane strip RL in the image shown in FIG. 3.

In the image evaluation method provided by the embodiment of the disclosure, whether a vehicle is deviated from a lane is detected based on the lane stripes in the image related to the driving environment, and a corresponding position of a feature portion of the vehicle corresponding to the image is compared with the lane stripes to determine whether the vehicle installing the electronic apparatus 100 crosses over the real lane stripes. In an embodiment of the disclosure, the feature portion of the vehicle is, for example, a left front headlight and a right front headlight. In detail, when a general image capturing unit 110 obtains the image related to the driving environment, the feature portion of the vehicle probably cannot be simultaneously captured. Therefore, it is required to further calculate the corresponding position of the feature portion corresponding to the image, and the corresponding position can be located within an extending range of the image.

Figure 6:
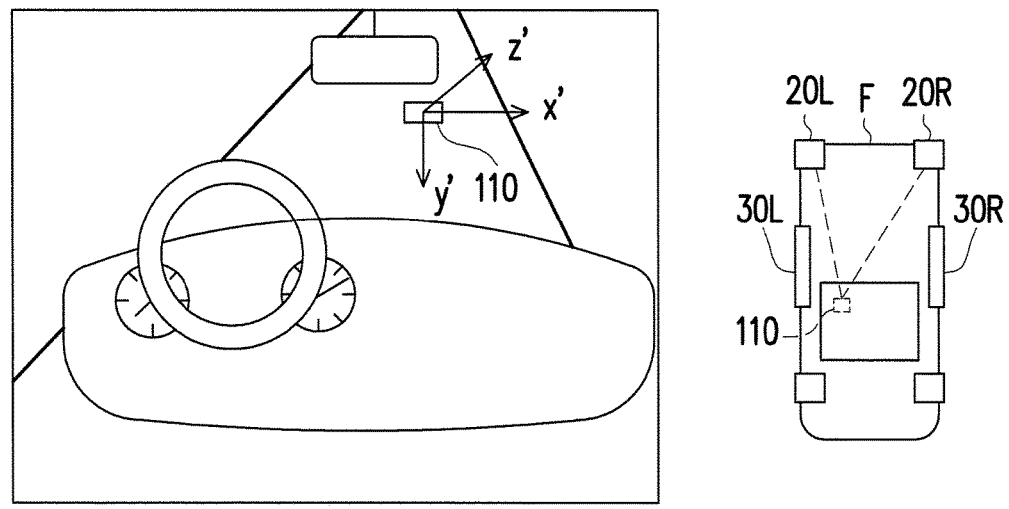
FIG. 6 is a schematic diagram illustrating a relationship between an image capturing unit and front headlights according to an embodiment of the disclosure.

Based on the above description, the calculation unit 130 further calculates a corresponding position of the feature portion of the vehicle in the extending range of the image based on projective geometry. First, the calculation unit 130 obtains position parameters of the feature portion relative to the image capturing unit 110. FIG. 6 is a schematic diagram illustrating a relationship between the image capturing unit and the front headlights according to an embodiment of the disclosure. Referring to FIG. 6, the image capturing unit 110 of a vehicle 10 is used for obtaining an image related to the driving environment. In a real coordinate system (x', y', z'), a distance between the image capturing unit 110 and the left front headlight 20L on an x'-axis is, for example, a distance between the image capturing unit 110 and a left door 30L, which is indicated as CAM_TO_L_DOOR. A distance between the image capturing unit 110 and the left front headlight 20L on a y'-axis is, for example, a distance between the image capturing unit 110 and the ground, i.e. a height of the image capturing unit 110, which is indicated as CAM_H. It should be noted that, when it is determined whether the left front headlight 20L crosses over the real lane stripe, a point projected to the ground by the left front headlight 20L is generally adopted to determine whether the left front headlight 20L crosses over the real lane stripe, so that the distance between the image capturing unit 110 and the left front headlight 20L on the y'-axis is taken as a distance between the image capturing unit 110 and the ground. A distance between the image capturing unit 110 and the left front headlight 20L on a z'-axis is a distance between the image capturing unit 110 and a vehicle front F, which is indicated as CAM_TO_HEAD. In the present embodiment, a unit of the position parameters CAM_TO_L_DOOR, CAM_H, CAM_TO_HEAD is, for example, meter. If the image capturing unit 110 is taken as an origin of the real coordinate system (x', y', z'), (CAM_TO_L_DOOR, CAM_H, CAM_TO_HEAD) is then a coordinate point of the left front headlight 20L in the real coordinate system (x', y', z'). It should be noted, that if a left direction is taken as a negative direction of the x'-axis, the position parameter CAM_TO_L_DOOR has a negative value.

Similarly, in the present embodiment, a distance between the image capturing unit 110 and the right front headlight 20R on the x'-axis is, for example, a distance between the image capturing unit 110 and a right door 30R, which is indicated as CAM_TO_R_DOOR. A distance between the image capturing unit 110 and the right front headlight 20R on the y'-axis is, for example, a distance between the image capturing unit 110 and the ground, which is indicated as CAM_H. A distance between the image capturing unit 110 and the right front headlight 20R on the z'-axis is a distance between the image capturing unit 110 and the vehicle front F, which is indicated as CAM_TO_HEAD. If the image capturing unit 110 is taken as an origin of the real coordinate system (x', y', z'), (CAM_TO_R_DOOR, CAM_H, CAM_TO_HEAD) is then a coordinate point of the right front headlight 20R in the real coordinate system (x', y', z'). A unit of the position parameter CAM_TO_R_DOOR is, for example, meter.

It should be noted that, a focal length F_L and a pitch angle P_A of the image capturing unit 110 are all position parameters. A unit of the focal length F_L is, for example, meter, and the pitch angle P_A is a position parameter greater than 0 in case of a pitch-down angle, and is a position parameter smaller than 0 in case of a pitch-up angle.

After the aforementioned position parameters are obtained, the calculation unit 130 calculates corresponding positions of the feature portions (the left front headlight 20L and the right front headlight 20R) in the extending range of the image related to the driving environment according to the position parameters. To be specific, in the present embodiment, it is assumed that an image capturing range of the image capturing unit 110 is large enough, the image of the left front headlight 20L and the right front headlight 20R can be captured. Therefore, in an embodiment of the disclosure, if the image related to the driving environment has an image coordinate system (x, y), the calculation unit 130 may calculate corresponding positions of the left front headlight 20L and the right front headlight 20R on the image coordinate system (x, y) based on projective geometry.

In detail, if the coordinates of the image center PC are (CAM_CEN_C, CAM_CEN_V), the corresponding position (LX, LY) of the left front headlight 20L on the image coordinate system (x, y) can be obtained according to following equations:

$$LX = \text{CAM\_CEN\_C} + \frac{(-\text{CAM\_TO\_L\_DOOR} \times \text{F\_L})}{(\text{CAM\_H} \times \sin\text{P\_A} + \text{CAM\_TO\_HEAD} \times \cos\text{P\_A})} \quad (1)$$

$$LY = \text{CAM\_CEN\_V} + \frac{(\text{CAM\_H} \times \text{F\_L} \times \cos\text{P\_A} - \text{CAM\_TO\_HEAD} \times \text{F\_L} \times \sin\text{P\_A})}{(\text{CAM\_H} \times \sin\text{P\_A} + \text{CAM\_TO\_HEAD} \times \cos\text{P\_A})} \quad (2)$$

Similarly, if the coordinates of the image center PC are (CAM_CEN_C, CAM_CEN_V), the corresponding position (RX, RY) of the right front headlight 20R on the image coordinate system (x, y) can be obtained according to following equations:

$$RX = \text{CAM\_CEN\_C} + \frac{(\text{CAM\_TO\_R\_DOOR} \times \text{F\_L})}{(\text{CAM\_H} \times \sin\text{P\_A} + \text{CAM\_TO\_HEAD} \times \cos\text{P\_A})} \quad (3)$$

$$RY = \text{CAM\_CEN\_V} + \frac{(\text{CAM\_H} \times \text{F\_L} \times \cos\text{P\_A} - \text{CAM\_TO\_HEAD} \times \text{F\_L} \times \sin\text{P\_A})}{(\text{CAM\_H} \times \sin\text{P\_A} + \text{CAM\_TO\_HEAD} \times \cos\text{P\_A})} \quad (4)$$

It should be noted that, on the image related to the driving environment, the image coordinate system (x, y) takes an upper left corner of the image as an origin, and a unit of the image coordinate system (x, y) is pixel number. Moreover, on the y-axis, the corresponding positions LY and RY are the same position.

Figure 7:
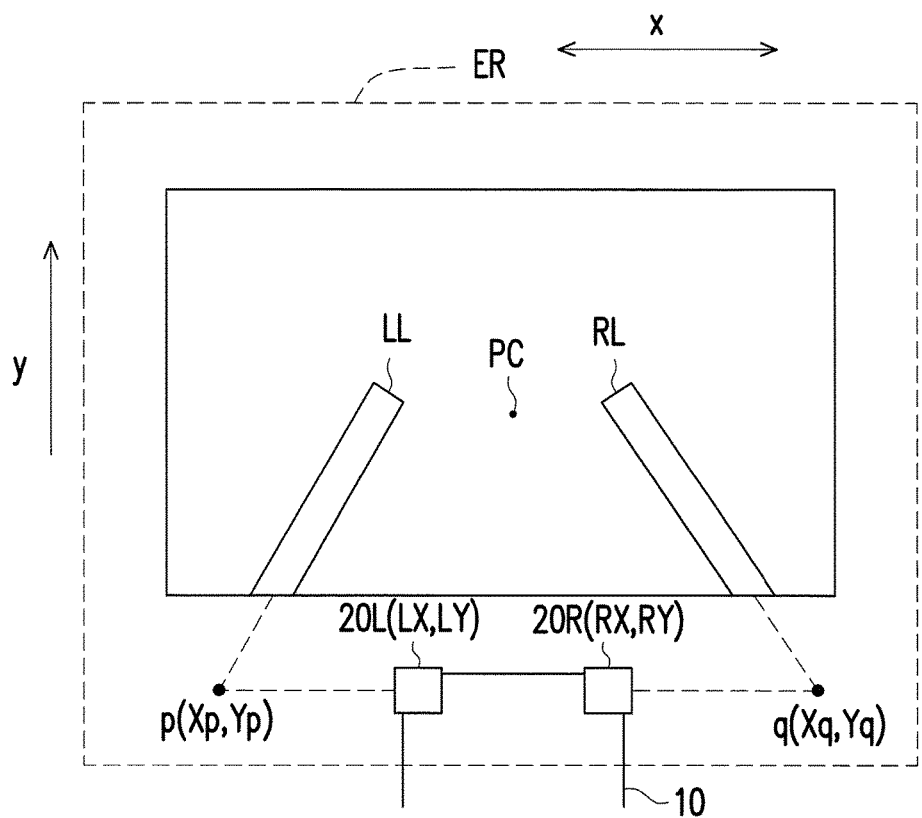
FIG. 7 is a schematic diagram of determining whether a vehicle crosses over real lane stripes.

After the corresponding positions of the feature portions (the left front headlight 20L and the right front headlight 20R) in the extending range of the image related to the driving environment are obtained, the comparison unit 140 further compares the corresponding positions with the lane stripes to determine whether the vehicle 10 crosses over the real lane stripes. FIG. 7 is a schematic diagram of determining whether a vehicle crosses over real lane stripes. Referring to FIG. 7, the corresponding positions (i.e. coordinates) of the left front headlight 20L and the right front headlight 20R in the extending range ER of the image are respectively (LX, LY) and (RX, RY). On the other hand, by extending the lane stripes LL and RL consisting of the candidate pairs and the corresponding candidate points, the comparison unit 140 further obtain a p point and a q point in the extending range ER. Corresponding positions Yp and Yq of the p point and the q point on the y-axis are respectively parallel to the corresponding positions LY and RY of the left front headlight 20L and the right front headlight 20R on the y-axis. Therefore, in the present embodiment, the comparison unit 140 may only adopt the corresponding positions LX and Xp of the left front headlight 20L and the p point on the x-axis to determine whether the vehicle 10 crosses over the left lane stripe LL, and adopt the corresponding positions RX and Xq of the right front headlight 20R and the q point on the x-axis to determine whether the vehicle 10 crosses over the right lane stripe RL.

To be specific, if LX minus Xp is smaller than 0, it represents that the vehicle 10 is crossing over the real left lane stripe. On the other hand, if Yq minus Rx is smaller than 0, it represents that the vehicle 10 is crossing over the real right lane stripe.

Moreover, based on projective geometry, on the real coordinate system (x', y', z'), a distance LD between the left front headlight 20L and the real left lane stripe can be obtained according to a following equation.

$$LD = \frac{(LX - Xp) \times}{(CAM\_H \times \sinP\_A + CAM\_TO\_HEAD \times \cosP\_A)}{F\_L} \quad (5)$$

On the other hand, based on projective geometry, on the real coordinate system (x', y', z'), a distance RD between the right front headlight 20R and the real right lane stripe can be obtained according to a following equation.

$$RD = \frac{(Xq - RX) \times}{(CAM\_H \times \sinP\_A + CAM\_TO\_HEAD \times \cosP\_A)}{F\_L} \quad (6)$$

The unit of the distances LD and RD is meter, and if the distance LD or the distance RD is smaller than 0, it represents that the vehicle 10 crosses over the real lane stripe. Moreover, if it discovered that the distance LD or the distance RD is gradually decreased after repeated calculations, it represents that the vehicle 10 gradually moves towards the real left lane stripe or the real right lane stripe.

Figure 8:
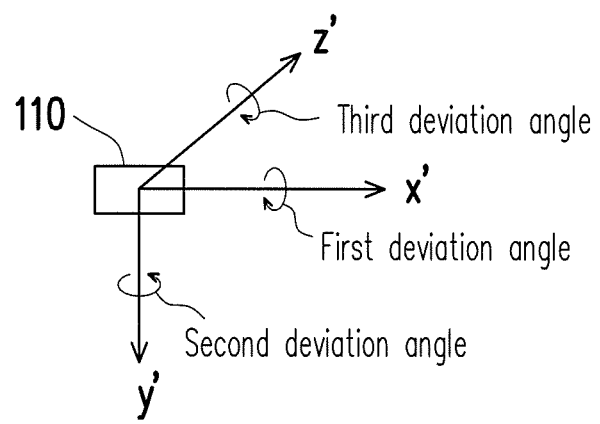
FIG. 8 is a schematic diagram of deviation of an image capturing unit according to an embodiment of the disclosure.

In an embodiment of the disclosure, when the lane deviation evaluation is executed, the image capturing unit 110 is required to be aligned with a moving direction of the vehicle to correctly capture image and provide accurate evaluation. In other words, if a setting angle of the image capturing unit 110 is deviated, it may cause inaccurate evaluation result. FIG. 8 is a schematic diagram of deviation of the image capturing unit according to an embodiment of the disclosure. Referring to FIG. 8, on the real coordinate system (x', y', z'), the image capturing unit 110 is probably respectively deviated along an x'-axis direction (a first direction), a y'-axis direction (a second direction) and a z'-axis direction (a third direction) to have a first deviation angle, a second deviation angle and a third deviation angle.

In the present embodiment, the correction unit 170 of the electronic apparatus 100 is coupled to the image capturing unit 110, and calculates the first deviation angle, the second deviation angle and the third deviation angle of the image capturing unit 110 along the x'-axis direction (the first direction), the y'-axis direction (the second direction) and the z'-axis direction (the third direction), and selectively corrects a setting position of the image capturing unit 110, or corrects the image related to the driving environment according to the first deviation angle, the second deviation angle and the third deviation angle. It should be noted that, when the image capturing unit 110 is set, a pitch angle thereof along the x'-axis direction (the first direction) is adjusted, so that the pitch angle has to be considered in calculation of the first deviation angle.

Figure 9:
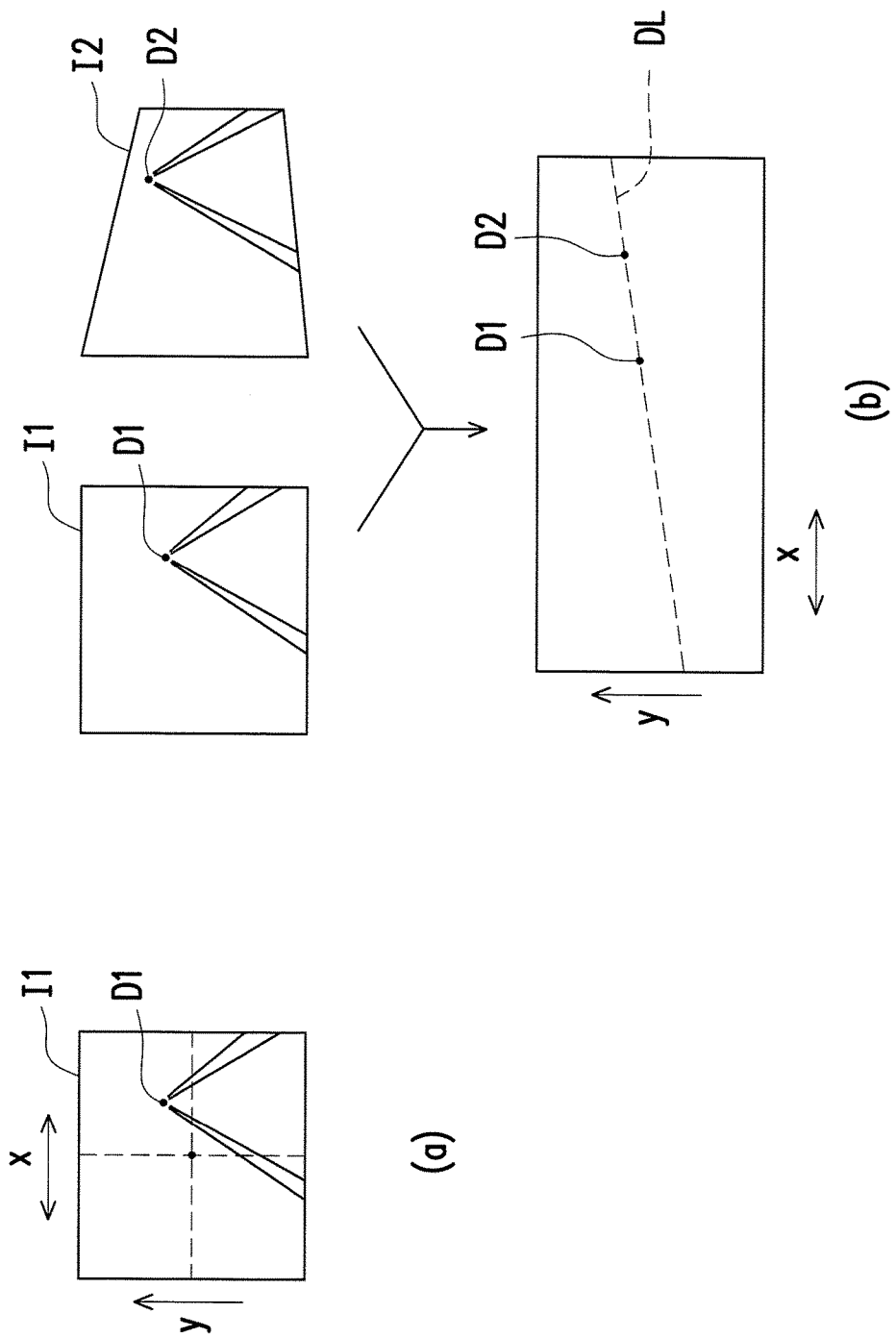
FIG. 9 is a schematic diagram of calculating deviation angles according to an embodiment of the disclosure.

FIG. 9 is a schematic diagram of calculating deviation angles according to an embodiment of the disclosure. Referring to FIG. 9, in the present embodiment, the correction unit 120 calculates the first deviation angle, the second deviation angle and the third deviation angle by using a plurality of parallel straight lines in reality, for example, a plurality of lane stripes. To be specific, the image capturing unit 110 can be used to capture a scene including a plurality of parallel straight lines to obtain a first correction image I1. To be specific, the image capturing unit 110 is required to face an extending direction of the above straight lines, and captures the scene to obtain the first correction image I1. As shown in a part (a) of FIG. 9, in the first correction image I1, a plurality of first straight line features corresponding to the parallel straight lines in reality may eventually meet at a first disappear point position D1.

To be specific, if the image capturing unit 110 does not have the first deviation angle and the pitch angle along the x'-axis direction (the first direction), a coordinate of the first disappear point position D1 on the y-axis of the first correction image I1 is about a half of an overall height of the first correction image I1 on the y-axis. Based on the aforementioned fact, the correction unit 170 may correspondingly correct the setting of the image capturing unit 110 along the x'-axis direction (the first direction), or directly correct the image related to the driving environment. Similarly, if the image capturing unit 110 does not have the second deviation angle along the y'-axis direction (the second direction), a coordinate of the first disappear point position D1 on the x-axis of the first correction image I1 is about a half of an overall width of the first correction image I1 on the x-axis. Based on the aforementioned fact, the correction unit 170 may correspondingly correct the setting of the image capturing unit 110 along the y'-axis direction (the second direction), or directly correct the image related to the driving environment.

It should be noted that, if the third deviation angle exists, when the first deviation angle and the second deviation angle are calculated, the third deviation angle may cause an error in calculation. Therefore, in the aforementioned embodiment, when the first deviation angle and the second deviation angle are calculated, the influences of the third deviation angle is required to be excluded.

Referring to a part (b) of FIG. 9, in the present embodiment, after the image capturing unit 110 is used to capture the scene including a plurality of parallel straight lines to obtain the first correction image I1, the vehicle installing the image capturing unit 110 is rotated by a rotation angle, and then the image capturing unit 110 is again used to capture the scene including a plurality of parallel straight lines to obtain a second correction image I2. Then, the correction unit 170 compares the first disappear point position D1 with a second disappear point position D2 to determine the third deviation angle. In the second correction image I2, a plurality of second straight line features corresponding to the parallel straight lines in reality may eventually meet at the second disappear point position D2.

Generally, if the image capturing unit 110 is not deviated along the z'-axis direction (the third direction), after the first correction image I1 and the second correction image I2 are combined or merged, a disappear line DL extending between the first disappear point position D1 and the second disappear point position D2 should be parallel to an image edge, and the image edge corresponding to the ground of the environment where the vehicle is located. However, if the image capturing unit 110 is deviated along the z'-axis direction (the third direction) to have the third deviation angle, the disappear line DL and the image edge may have a skew angle there between. Based on the above skew angle, the correction unit 170 may correspondingly correct the setting of the image capturing unit 110 along the z'-axis direction (the third direction), or directly correct the image related to the driving environment.

In an embodiment of the disclosure, if the electronic apparatus 100 determines that the vehicle 10 crosses over the real lane stripes, the output unit 160 generates a warning message. To be specific, the warning message is, for example, a warning text or a warning sound.

In summary, in the image evaluation method and the electronic apparatus thereof provided by the disclosure, the evaluation criterion is adopted to evaluate the candidate pairs and the corresponding candidate points in the image to recognize the lane strips, and the corresponding position of the feature portion corresponding to the image is compared with the lane stripes to determine whether the vehicle crosses over the real lane stripes, so as to achieve more accurate lane strip recognition and lane deviation evaluation.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An image evaluation method, adapted to an electronic apparatus installed in a vehicle for evaluating whether the vehicle is deviated from a lane, wherein the electronic apparatus comprises at least one image capturing unit, the image evaluation method comprising:
   obtaining an image related to a driving environment by the image capturing unit;
   evaluating a plurality of candidate pairs and corresponding candidate points in the image according to an evaluation criterion from an arbitrary row of pixels of the image to recognize a lane stripe in the image;
   calculating a corresponding position of a feature portion of the vehicle corresponding to the image; and
   comparing the corresponding position of the feature portion corresponding to the image with the lane stripe to determine whether the vehicle is towards or crosses over a real lane stripe.

2. The image evaluation method as claimed in claim 1, wherein the step of obtaining the image related to the driving environment comprises:
   obtaining an original image of the driving environment; and
   executing a digital image processing to the original image to obtain the image.

3. The image evaluation method as claimed in claim 1, wherein the step of evaluating the candidate pairs and the corresponding candidate points according to the evaluation criterion to recognize the lane stripe comprises:
   taking a part of the image as a recognition image according to an image center of the image;
   from a row of pixels of the recognition image, obtaining a set of brightness variation points of the row of pixels, wherein the set of the brightness variation points comprise a first brightness variation point and a second brightness variation point; and
   determining whether the set of the brightness variation points is defined as the candidate pair according to the evaluation criterion.

4. The image evaluation method as claimed in claim 3, wherein the step of evaluating the candidate pairs and the corresponding candidate points according to the evaluation criterion to recognize the lane stripe further comprises:
   adding a form to store the candidate pair and the corresponding candidate point when the set of the brightness variation points is defined as the candidate pair, and the row of pixels including the set of the brightness variation points is the arbitrary row of pixels, wherein the corresponding candidate point is a center point of the brightness variation points; and
   according to the evaluation criterion, determining the form where the candidate pair and the corresponding candidate point are to be stored or adding the form to store the candidate pair and the corresponding candidate point when the set of the brightness variation points is defined as the candidate pair, and the row of pixels including the set of the brightness variation points is not the arbitrary row of pixels.

5. The image evaluation method as claimed in claim 4, wherein the step of determining whether the set of the brightness variation points is defined as the candidate pair according to the evaluation criterion comprises:
   determining whether a brightness difference between a brightness value between the brightness variation points and a brightness value before the first brightness variation point or a brightness value after the second brightness variation point is greater than a brightness difference threshold, if not, the set of the brightness variation points is not defined as the candidate pair;
   determining whether a width between the brightness variation points is complied with a proper width range, if not, the set of the brightness variation points is not defined as the candidate pair; and
   determining whether directions of brightness gradients respectively corresponding to the brightness variation points are consistent, if not, the set of the brightness variation points is not defined as the candidate pair.

6. The image evaluation method as claimed in claim 4, wherein the step of determining the form where the candidate pair and the corresponding candidate point of the row of pixels are to be stored or adding the form to store the candidate pair and the corresponding candidate point of the row of pixels according to the evaluation criterion, comprises:
   obtaining the candidate pair belonging to a previous row of pixels of the recognition image, wherein the row of pixels is adjacent to the previous row of pixels, and the candidate pair of the previous row of pixels is a set of previous brightness variation points, and the set of the previous brightness variation points comprise a first previous brightness variation point and a second previous brightness variation point; and
   determining whether a direction of a brightness gradient corresponding to the first brightness variation point of the candidate pair of the row of pixels is consistent with a direction of a previous brightness gradient corresponding to the first previous brightness variation point, if not, the candidate pair of the row of pixels is not stored in the form corresponding to the candidate pair of the previous row of pixels,
   wherein when the candidate pair of the row of pixels is not stored in the form corresponding to any of the candidate pair of the previous row of pixels, the form is added to store the candidate pair of the row of pixels.

7. The image evaluation method as claimed in claim 6, wherein the step of determining the form where the candidate pair and the corresponding candidate point of the row of pixels are to be stored or adding the form to store the candidate pair and the corresponding candidate point of the row of pixels according to the evaluation criterion, further comprises:
   determining whether a distance between a pixel position of the first brightness variation point of the candidate pair of the row of pixels and a previous pixel position is lower than a distance threshold according to the previous pixel position of the first previous brightness variation point, if not, the candidate pair of the row of pixels is not stored in the form corresponding to the candidate pair of the previous row of pixels; and determining whether a width between the brightness variation points of the candidate pair of the row of pixels is lower than a previous width according to the previous width between the previous brightness variation points, if not, the candidate pair of the row of pixels is not stored in the form corresponding to the candidate pair of the previous row of pixels.

8. The image evaluation method as claimed in claim 7, wherein the step of determining the form where the candidate pair and the corresponding candidate point of the row of pixels are to be stored or adding the form to store the candidate pair and the corresponding candidate point of the row of pixels according to the evaluation criterion, further comprises:

determining whether the pixel position of the first brightness variation point of the candidate pair of the row of pixels is closer to the image center compared to the previous pixel position of the first previous brightness variation point when the row of pixels of the recognition image does not reach a limit row of the recognition image, and the first brightness variation point of the row of pixel is not in a center section of the recognition image, if not, the candidate pair of the row of pixels is not stored in the form corresponding to the candidate pair of the previous row of pixels.

9. The image evaluation method as claimed in claim 6, wherein the step of determining the form where the candidate pair and the corresponding candidate point of the row of pixels are to be stored or adding the form to store the candidate pair and the corresponding candidate point of the row of pixels according to the evaluation criterion, further comprises:

determining whether the candidate pair of the row of pixels is adjacent to the other candidate pairs of the recognition image, if not, the form is added to store the candidate pair of the row of pixels; and obtaining a previous slope corresponding to the first previous brightness variation point of the previous row of pixels, calculating a slope between the first brightness variation point of the candidate pair of the row of pixels and the first previous brightness variation point, and determining whether a slope difference between the previous slope and the slope is lower than a slope threshold, if not, the form is added to store the candidate pair of the row of pixels.

10. The image evaluation method as claimed in claim 4, wherein the step of evaluating the candidate pairs and the corresponding candidate points according to the evaluation criterion to recognize the lane stripe comprises:

determining whether the candidate pairs stored in any of the form reaches a predetermined number;

selecting the form reaching the predetermined number as a fixed form when the candidate pairs stored in any of the form reaches the predetermined number; and if the fixed form exists, then when the set of the brightness variation points is defined as the candidate pair, and the row of pixels including the set of the brightness variation points is not the arbitrary row of pixels, determining whether the candidate pair of the row of pixels and the corresponding candidate point are suitable for being stored in the fixed form according to the evaluation criterion.

11. The image evaluation method as claimed in claim 10, wherein the step of evaluating the candidate pairs and the corresponding candidate points according to the evaluation criterion to recognize the lane stripe further comprises:

determining whether the row of pixels reaches a cut-off line in the recognition image; and obtaining the lane stripe according to the candidate pairs and the corresponding candidate points stored in the fixed form when the row of pixels reaches the cut-off line in the recognition image.

12. The image evaluation method as claimed in claim 1, wherein the step of calculating the corresponding position of the feature portion of the vehicle corresponding to the image comprises:

obtaining position parameters of the feature portion relative to the at least one image capturing unit; and calculating the corresponding position of the feature portion in an extending range of the image according to the position parameters.

13. The image evaluation method as claimed in claim 1, further comprising:

generating a warning message when it is determined that the vehicle crosses over the real lane stripe.

14. The image evaluation method as claimed in claim 1, further comprising:

respectively calculating a first deviation angle, a second deviation angle and a third deviation angle of the at least one image capturing unit along a first direction, a second direction and a third direction; and correcting the at least one image capturing unit or the image related to the driving environment based on the first deviation angle, the second deviation angle and the third deviation angle.

15. The image evaluation method as claimed in claim 14, wherein the step of calculating the first deviation angle, the second deviation angle and the third deviation angle comprises:

capturing a scene having a plurality of parallel straight lines by using the at least one image capturing unit to obtain a first correction image;

rotating the vehicle by a rotation angle, and capturing the scene having the straight lines by using the at least one image capturing unit to obtain a second correction image;

determining the first deviation angle and the second deviation angle according to a first disappear point position on the first correction image, wherein the first disappear point position is a meeting position of a plurality of first straight line features corresponding to the straight lines on the first correction image; and comparing the first disappear point position and a second disappear point position on the second correction image to determine the third deviation angle, wherein the second disappear point position is a meeting position of a plurality of second straight line features corresponding to the straight lines on the second correction image.

16. An electronic apparatus, adapted to be installed in a vehicle for evaluating whether the vehicle is deviated from a lane, the electronic apparatus comprising:

a processor configured to control:

at least one image capturing unit, adapted to obtain an image related to a driving environment;

a recognition unit, coupled to the at least one image capturing unit, and evaluating a plurality of candidate pairs and corresponding candidate points in the image according to an evaluation criterion from an arbitrary row of pixels of the image to recognize a lane stripe in the image;

a calculation unit, coupled to the at least one image capturing unit and the recognition unit, and calculating a corresponding position of a feature portion of the vehicle corresponding to the image; and a comparison unit, coupled to the recognition unit and the calculation unit, and comparing the corresponding position of the feature portion corresponding to the image with the lane stripe to determine whether the vehicle is towards or crosses over a real lane stripe.

17. The electronic apparatus as claimed in claim 16, further comprising:

an image unit, coupled to the at least one image capturing unit, the recognition unit and the calculation unit, wherein the at least one image capturing unit obtains an original image of the driving environment, and the image unit executes a digital image processing to the original image to obtain the image.

18. The electronic apparatus as claimed in claim 16, wherein the recognition unit takes a part of the image as a recognition image according to an image center of the image, and, from a row of pixels of the recognition image, obtains a set of brightness variation points of the row of pixels, wherein the set of the brightness variation points comprise a first brightness variation point and a second brightness variation point, the recognition unit determines whether the set of the brightness variation points is defined as the candidate pair according to the evaluation criterion.

19. The electronic apparatus as claimed in claim 18, wherein the recognition unit adds a form to store the candidate pair and the corresponding candidate point when the set of the brightness variation points is defined as the candidate pair, and the row of pixels including the set of the brightness variation points is the arbitrary row of pixels, wherein the corresponding candidate point is a center point of the brightness variation points, the recognition unit further determines the form where the candidate pair and the corresponding candidate point are to be stored or adds the form to store the candidate pair and the corresponding candidate point according to the evaluation criterion when the set of the brightness variation points is defined as the candidate pair, and the row of pixels including the set of the brightness variation points is not the arbitrary row of pixels.

20. The electronic apparatus as claimed in claim 19, wherein the recognition unit determines whether a brightness difference between a brightness value between the brightness variation points and a brightness value before the first brightness variation point or a brightness value after the second brightness variation point is greater than a brightness difference threshold, if not, the set of the brightness variation points is not defined as the candidate pair, the recognition unit determines whether a width between the brightness variation points is complied with a proper width range, if not, the set of the brightness variation points is not defined as the candidate pair, the recognition unit determines whether directions of brightness gradients respectively corresponding to the brightness variation points are consistent, if not, the set of the brightness variation points is not defined as the candidate pair.

21. The electronic apparatus as claimed in claim 19, wherein the recognition unit obtains the candidate pair belonging to a previous row of pixels of the recognition image, wherein the row of pixels is adjacent to the previous row of pixels, and the candidate pair of the previous row of pixels is a set of previous brightness variation points, and the set of the previous brightness variation points comprise a first previous brightness variation point and a second previous brightness variation point, the recognition unit determines whether a direction of a brightness gradient corresponding to the first brightness variation point of the candidate pair of the row of pixels is consistent with a direction of a previous brightness gradient corresponding to the first previous brightness variation point, if not, the candidate pair of the row of pixels is not stored in the form corresponding to the candidate pair of the previous row of pixels, wherein when the candidate pair of the row of pixels is not stored in the form corresponding to any of the candidate pair of the previous row of pixels, the form is added to store the candidate pair of the row of pixels.

22. The electronic apparatus as claimed in claim 21, wherein the recognition unit determines whether a distance between a pixel position of the first brightness variation point of the candidate pair of the row of pixels and a previous pixel position is lower than a distance threshold according to the previous pixel position of the first previous brightness variation point, if not, the candidate pair of the row of pixels is not stored in the form corresponding to the candidate pair of the previous row of pixels, the recognition unit determines whether a width between the brightness variation points of the candidate pair of the row of pixels is lower than a previous width according to the previous width between the previous brightness variation points, if not, the candidate pair of the row of pixels is not stored in the form corresponding to the candidate pair of the previous row of pixels.

23. The electronic apparatus as claimed in claim 22, wherein the recognition unit determines whether the pixel position of the first brightness variation point of the candidate pair of the row of pixels is closer to the image center compared to the previous pixel position of the first previous brightness variation point when the row of pixels of the recognition image does not reach a limit row of the recognition image, and the first brightness variation point of the row of pixel is not in a center section of the recognition image, if not, the candidate pair of the row of pixels is not stored in the form corresponding to the candidate pair of the previous row of pixels.

24. The electronic apparatus as claimed in claim 21, wherein the recognition unit determines whether the candidate pair of the row of pixels is adjacent to the other candidate pairs of the recognition image, if not, the form is added to store the candidate pair of the row of pixels, the recognition unit obtains a previous slope corresponding to the first previous brightness variation point of the previous row of pixels, calculates a slope between the first brightness variation point of the candidate pair of the row of pixels and the first previous brightness variation point, and determines whether a slope difference between the previous slope and the slope is lower than a slope threshold, if not, the form is added to store the candidate pair of the row of pixels.

25. The electronic apparatus as claimed in claim 19, wherein the recognition unit determines whether the candidate pairs stored in any of the form reaches a predetermined number, the recognition unit selects the form reaching the predetermined number as a fixed form when the candidate pairs stored in any of the form reaches the predetermined number, if the fixed form exists, then when the set of the brightness variation points is defined as the candidate pair, and the row of pixels including the set of the brightness variation points is not the arbitrary row of pixels, the recognition unit determines whether the candidate pair of the row of pixels and the corresponding candidate point are suitable for being stored in the fixed form according to the evaluation criterion.

26. The electronic apparatus as claimed in claim 25, wherein the recognition unit determines whether the row of pixels reaches a cut-off line in the recognition image, and the recognition unit obtains the lane stripe according to the candidate pairs and the corresponding candidate points stored in the fixed form when the row of pixels reaches the cut-off line in the recognition image.

27. The electronic apparatus as claimed in claim 16, wherein the calculation unit obtains position parameters of the feature portion relative to the at least one image capturing unit, and calculates the corresponding position of the feature portion in an extending range of the image according to the position parameters.

28. The electronic apparatus as claimed in claim 16, further comprising:
an output unit, coupled to the comparison unit, and generating a warning message when the comparison unit determines that the vehicle crosses over the real lane stripe.

29. The electronic apparatus as claimed in claim 16, further comprising:
a correction unit, coupled to the at least one image capturing unit, and respectively calculating a first deviation angle, a second deviation angle and a third deviation angle of the at least one image capturing unit along a first direction, a second direction and a third direction, and corrects the at least one image capturing unit or the image related to the driving environment based on the first deviation angle, the second deviation angle and the third deviation angle.

30. The electronic apparatus as claimed in claim 29, wherein the electronic apparatus captures a scene having a plurality of parallel straight lines by using the at least one image capturing unit to obtain a first correction image, and after the vehicle is rotated by a rotation angle, the electronic apparatus captures the scene having the straight lines by using the at least one image capturing unit to obtain a second correction image,
the correction unit determines the first deviation angle and the second deviation angle according to a first disappear point position on the first correction image, wherein the first disappear point position is a meeting position of a plurality of first straight line features corresponding to the straight lines on the first correction image,
the correction unit compares the first disappear point position and a second disappear point position on the second correction image to determine the third deviation angle, wherein the second disappear point position is a meeting position of a plurality of second straight line features corresponding to the straight lines on the second correction image.

* * * * *